Oct. 30, 1923.  
W. C. SKILES  
CUSHION GRIP FOR STEERING WHEEL  
Original Filed Feb. 26, 1920

1,472,689

Inventor  
William C. Skiles,  
By  
Attorney

Patented Oct. 30, 1923.

1,472,689

UNITED STATES PATENT OFFICE.

WILLIAM C. SKILES, OF JACKSON, MICHIGAN.

CUSHION GRIP FOR STEERING WHEELS.

Application filed February 26, 1920, Serial No. 361,443. Renewed August 20, 1923.

*To all whom it may concern:*

Be it known that I, WILLIAM C. SKILES, a citizen of the United States of America, residing at Jackson, in the county of Jackson and State of Michigan, have invented new and useful Improvements in Cushion Grips for Steering Wheels, of which the following is a specification.

The object of the invention is to provide a device adapted for manufacture and use as an attachment for the steering or hand wheels of automobiles and similar vehicles whereby the vibration of the steering wheel in its effect upon the hands of the operator is cushioned to minimize the strain and fatigue incident to the operation of a machine on rough roads, and also to provide a means whereby the friction of the grip upon the hands of the operator is increased to minimize the effect required to prevent the slipping of the rim of the wheel when strained circumferentially by the contact of the front wheels of the machine with obstacles on the road, and with this object in view the invention consists in a construction of which a preferred embodiment is shown in the accompanying drawing, wherein:

The device consists essentially of an annular cushion 10 cross-sectionally concavo-convex in form to form an inner concaved seat 11 for the reception of the periphery of the hand wheel rim 12 and a convex bearing surface 13 which may be milled or corrugated to provide a convenient gripping surface, and said ring is preferably made of comparatively soft or highly elastic rubber or similar material adapting it to be readily compressed or superficially depressed by the contact therewith of the hand of the operator, so as to enable the latter to maintain a firm grip of the wheel to prevent the rim from slipping circumferentially through the hand without necessitating a particularly tight or forceful grasping action of the hand and hence without the physical effort which is incurred in properly holding a steering wheel, particularly in driving over rough roads, when the surface of the rim is smooth or as in the ordinary practice consists of highly polished wood.

Figure 1:
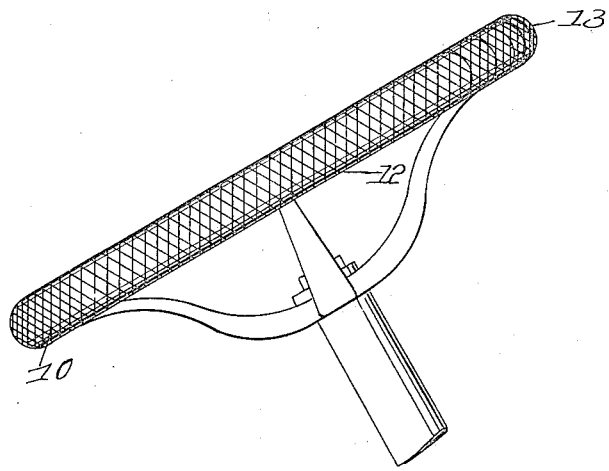
Figure 1 is a side view of a steering or hand wheel.
Figure 2:
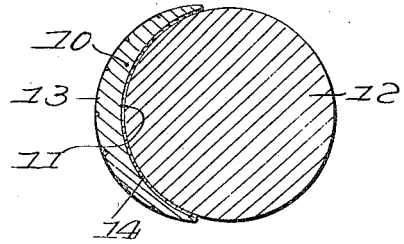
Figure 2 is a sectional view taken transversely through the rim.

The cushioning ring is of crescent shape in cross section with its thickness reduced toward the edges to cause the exterior surface to blend in effect into the surface of the wheel rim 12 and thus provide no abrupt angle or offset which would tend to cause discomfort to the driver, and in width said cushion is sufficient to cover approximately one-half of the circumferential surface of the rim, as indicated in Figure 2, so that in a plane perpendicular to the axis of the wheel the effect of the use of the cushion ring is to produce an elliptical grip with the frictional surface positioned to bear against the palm of the hand of the operator while the inner surface of the wheel rim is free and exposed to receive the bearing of the fingers of the hand.

While it is preferred as above indicated to employ rubber as the material for the purpose indicated, it is not intended to limit the scope of the invention to this material inasmuch as cork or a sufficiently resilient composition of fibrous structure may form a practical substitute for the same, but rubber is particularly adapted for the purpose in that the ring may be made of a diameter slightly less than that of the exterior surface of the wheel rim to which it is to be fitted to the end that the ring must be slightly stretched in order to fit it to the wheel rim, so that the contractile energy of the ring serves to maintain it in place and present a smooth surface for the bearing of the hands of the operator.

Also a suitable adhesive material may be arranged as indicated at 14 between the seat or inner surface of the cushion ring and the surface of the wheel rim to guard against any possibility of displacement.

What is claimed is:

A grip ring for steering wheels consisting of a cross-sectionally crescent-shaped body provided with an inner concaved seat for receiving the periphery of a steering wheel rim and tapered in thickness toward its lateral edges to merge the exterior surface thereof into the adjacent portions of the surface of said wheel rim.

In testimony whereof he affixes his signature.

WILLIAM C. SKILES.